US012790977B2

(12) United States Patent
Eto et al.

(10) Patent No.: US 12,790,977 B2
(45) Date of Patent: Nov. 10, 2026

(54) AIR INTAKE-TYPE TWO-STROKE ENGINE

(71) Applicant: YAMABIKO CORPORATION, Tokyo (JP)

(72) Inventors: Kuniyoshi Eto, Tokyo (JP); Yusuke Suzuki, Tokyo (JP)

(73) Assignee: YAMABIKO CORPORATION, Tokyo (JP)

(*) Notice: Subject to any disclaimer, the term of this patent is extended or adjusted under 35 U.S.C. 154(b) by 203 days.

(21) Appl. No.: 18/837,896

(22) PCT Filed: Feb. 25, 2022

(86) PCT No.: PCT/JP2022/007912

§ 371 (c)(1),
(2) Date: Mar. 18, 2025

(87) PCT Pub. No.: WO2023/162144

PCT Pub. Date: Aug. 31, 2023

(65) Prior Publication Data

US 2025/0207527 A1 Jun. 26, 2025

(51) Int. Cl.
*F02B 25/16* (2006.01)
*F02M 69/10* (2006.01)

(52) U.S. Cl.
CPC ............. *F02B 25/16* (2013.01); *F02M 69/10* (2013.01)

(58) Field of Classification Search
CPC .......... F02B 25/16; F02B 25/14; F02B 33/04; F02B 2075/025; F02M 69/10; Y02T 10/12
USPC ........... 123/73 A, 73 AA, 73 B, 73 C, 73 PP
See application file for complete search history.

(56) References Cited

U.S. PATENT DOCUMENTS

| | | | | |
|---|---|---|---|---|
| 4,779,581 | A | 10/1988 | Maier | |
| 4,907,549 | A | 3/1990 | Morikawa et al. | |
| 6,289,856 | B1 | 9/2001 | Noguchi | |
| 6,851,402 | B2 * | 2/2005 | Rosskamp | F02F 1/22 123/65 P |
| 7,536,983 | B2 * | 5/2009 | Layher | F02B 33/04 73/114.34 |
| 7,574,985 | B2 * | 8/2009 | Kirchberger | F02M 69/044 123/73 A |
| 8,555,831 | B2 * | 10/2013 | Paa | F02B 25/00 123/73 A |

(Continued)

FOREIGN PATENT DOCUMENTS

| | | | |
|---|---|---|---|
| JP | S64-24113 | A | 1/1989 |
| JP | H01-162036 | U | 11/1989 |

(Continued)

OTHER PUBLICATIONS

International Search Report issued in corresponding International Patent Application No. PCT/JP2022/007912 mailed Mar. 29, 2022 (3 pages).

*Primary Examiner* — Hai H Huynh
(74) *Attorney, Agent, or Firm* — Kilyk & Bowersox, P.L.L.C.

(57) ABSTRACT

In an air intake-type two-stroke engine 10, an exhaust port 20, a scavenging port 22, etc. are opened and closed by a piston 12. A fuel injection valve 60 is disposed at an upper end portion **24*a* of a scavenging passage 24. The fuel injection valve 60 is preferably arranged with its axis "Lax" directed toward the scavenging port 22**. The fuel injection timing is set to the latter half of the scavenging process or the latter half of the combustion process.

7 Claims, 7 Drawing Sheets

(56) References Cited

U.S. PATENT DOCUMENTS

| | | | | |
|---|---|---|---|---|
| 10,858,985 | B2 * | 12/2020 | Naegele | F02B 33/30 |
| 11,149,676 | B2 * | 10/2021 | Rehrl | F02M 69/042 |
| 2002/0179026 | A1 * | 12/2002 | Laimbock | F02B 25/20 123/65 A |
| 2006/0272599 | A1 * | 12/2006 | Johnson | F02M 69/046 123/65 PE |
| 2008/0083381 | A1 | 4/2008 | Kirchberger | |
| 2014/0238371 | A1 | 8/2014 | Yamazaki et al. | |
| 2015/0184574 | A1 | 7/2015 | Yamada et al. | |
| 2019/0323418 | A1 | 10/2019 | Naegele et al. | |
| 2023/0119430 | A1 | 4/2023 | Noguchi et al. | |
| 2023/0133431 | A1 | 5/2023 | Noguchi | |

FOREIGN PATENT DOCUMENTS

| | | | |
|---|---|---|---|
| JP | H02-140460 | A | 5/1990 |
| JP | H04-058024 | A | 2/1992 |
| JP | H07-026963 | A | 1/1995 |
| JP | 2014163244 | A | 9/2014 |
| JP | 2015124704 | A | 7/2015 |
| WO | 2020256624 | A1 | 12/2020 |
| WO | 2021176813 | A1 | 9/2021 |
| WO | 2021177010 | A1 | 9/2021 |

* cited by examiner

AIR INTAKE-TYPE TWO-STROKE ENGINE

This application is a National Stage Application of PCT/JP2022/007912, filed Feb. 25, 2022.

BACKGROUND OF THE INVENTION

The present invention relates to a piston valve two-stroke engine for use in a working machine, and more particularly it relates to an air intake-type two-stroke engine.

Portable working machines such as brush cutters, chain saws, and blowers use two-stroke engines as their power sources. Among the two-stroke engines, piston valve engines become widespread. In a piston valve two-stroke engine, a piston opens and closes an intake port, an exhaust port, and scavenging ports that open on the inner wall surface of a cylinder. A feature of the piston valve two-stroke engine is that it can be easily made compact and lightweight.

The two-stroke engines, however, has a fuel problem called "blow-by". A two-stroke engine completes one cycle with an upward and a downward stroke of a piston. Compression occurs while the piston is moving upward (upward stroke) in the cylinder. Meanwhile, fresh gas (generally, air-fuel mixture) is filled into a crankcase. The air-fuel mixture is pre-compressed in the crankcase while the piston is moving downward (downward stroke) due to combustion; exhaust and scavenging of the cylinder are performed in the latter half of the downward stroke. In the scavenging process, the pre-compressed air-fuel mixture is discharged from the crankcase through the scavenging ports into the cylinder, thereby scavenging the cylinder. Due to the structure and mechanism described above, the two-stroke engine inherently has the fuel problem.

One of the solutions to this problem is a stratified scavenging engine (U.S. Pat. No. 6,289,856 B1). Describing the stratified scavenging engine including a carburetor as an example, first, the upper parts of scavenging passages are filled with leading air while air-fuel mixture is introduced into a crankcase. The air-fuel mixture introduced into the crankcase is pre-compressed during the piston's downward stroke. The leading air in the scavenging passages is discharged into a cylinder in the early stage of the scavenging process, and then the air-fuel mixture in the crankcase is discharged into the cylinder.

Using a fuel injection valve instead of a carburetor is being considered for a two-stroke engine as well. Regarding an arrangement of the fuel injection valve, a direct injection two-stroke engine, in which the fuel injection valve is arranged facing the inside of the cylinder, has been developed. WO 2020/256624 A1 discloses a stratified scavenging engine in which the fuel injection valve is arranged facing the crankcase. In a two-stroke engine using the fuel injection valve, fresh air is supplied to the crankcase, and this fresh air is pre-compressed in the crankcase to be used for scavenging.

U.S. Pat. No. 10,858,985 B2 discloses an air intake-type two-stroke engine. The air intake-type two-stroke engine is characterized in that fresh air is supplied to a crankcase through scavenging passages. As used herein, "fresh air" means the air filtered by an air cleaner. The air intake-type two-stroke engine has piston grooves on the peripheral surface of the piston. These piston grooves can be connected to the scavenging passages at a predetermined timing. In the intake process, the fresh air filtered by the air cleaner is supplied to the crankcase through the intake passage, the intake port, the piston grooves, and the scavenging passages. Note that the air intake-type two-stroke engine is the same as other types of two-stroke engines in that the fresh air from the crankcase is discharged into the cylinder through the scavenging passages and the scavenging ports in the scavenging process.

The air intake-type two-stroke engine disclosed in U.S. Pat. No. 10,858,985 B2 includes a fuel injection valve. Regarding the arrangement of this fuel injection valve, U.S. Pat. No. 10,858,985 B2 discloses an embodiment in which the fuel injection valve is arranged in the longitudinal middle part of a scavenging passage. In this embodiment, reed valves are arranged at the inlets of the scavenging passages, i.e., at the upstream openings of the scavenging passages. The reed valves allow gas to flow from the crankcase to the scavenging passages. In other words, the flow of gas from the scavenging passages to the crankcase is prevented by the reed valves.

A mixed oil supply method and a separate oil supply method have been known for supplying lubricating oil to a two-stroke engine. A working machine generally uses the mixed oil supply method in which lubricating oil is blended with fuel. For example, a two-stroke engine cannot supply lubricating oil together with fuel to the crankcase if it uses a direct injection method in which a fuel injection valve is provided in the cylinder. Therefore, the two-stroke engine uses the separate oil supply method in this case. Using the separate oil supply method, however, has a disadvantage. The entire engine structure becomes more complicated and larger because the two-stroke engine includes an oil supply device to lubricate the crankcase.

The present invention has been conceived with a focus on the following two points. First, the scavenging passages are used not only for the scavenging process but also for the intake process in the air intake-type two-stroke engine. Second, fresh air flows toward the crankcase in the intake process. That is, the fresh air in the crankcase pre-compressed by the descending piston is discharged into the cylinder through the scavenging passages and the scavenging ports in the scavenging process. On the other hand, the air purified by the air cleaner is introduced into the crankcase through the intake port, the piston grooves, and the scavenging passages in the intake process. As described above, using the scavenging passages in the intake process is a feature of the air intake-type two-stroke engine. The direction of air flow passing through each scavenging passage reverses between the intake process and the scavenging process; and therefore, fresh air goes back and forth through each scavenging passage.

SUMMARY OF THE INVENTION

One of the objects of the present invention is to increase a degree of design freedom, including the lubricating oil supply method, of an air intake-type two-stroke engine without increasing its size. The other object is to provide an air intake-type two-stroke engine with high combustion efficiency and emission reduction effects.

A feature of the air intake-type two-stroke engine according to the present invention is providing a fuel injection valve in the upper end portion of a scavenging passage. A degree of design freedom of the air-intake type two-stroke engine can be increased by this means. In embodiments, the air intake-type two-stroke engine can improve combustion efficiency and emission reduction effects by combining with at least one of the injection direction of the fuel injection valve or the fuel injection timing. Also, the upper end portion of each scavenging passage is directly connected to a scavenging port. In other words, the upper end opening of each scavenging passage constitutes the scavenging port.

If the upper part of the fuel injection valve is called a "nozzle assembly," the fuel injection valve has a nozzle with an axis at its tip.

With regard to the installation of the fuel injection valve, there are two typical embodiments of in which direction the axis of the fuel injection valve is directed. In the first embodiment, the axis of the fuel injection valve is directed to the scavenging port: it is preferably directed to the center of the scavenging port. The fuel injection valve can inject fuel into a predetermined direction without being affected by the wall shape of the scavenging passage or the edge shape of the scavenging port in this embodiment. Therefore, the fuel discharged from the fuel injection valve can be supplied directly into the cylinder through the scavenging port, and it can cool the combustion chamber.

In the second embodiment, the axis of the fuel injection valve is directed toward the crankcase side of the scavenging passage. The fuel injection valve is installed at the upper end portion of the scavenging passage in this embodiment. Also, the lower end opening of the scavenging passage is connected to the crankcase; and therefore, the fuel discharged from the fuel injection valve can be supplied into the crankcase. By supplying the fuel discharged from the fuel injection valve into the crankcase, a uniform-density air-fuel mixture is created within the crankcase.

There are two ways of setting the fuel injection timing. The first way is setting the fuel injection timing in the latter half of the scavenging process. This method is preferable when the fuel injection valve is provided at the upper end portion of the scavenging passage. By setting the fuel injection timing in the latter half of the scavenging process, the crankcase can be lubricated while preventing the fuel problem "blow-by".

The other way is setting the fuel injection timing in the latter half of the combustion process. By this means, the crankcase can be lubricated while the cylinder is cooled. In either case of timing, the fuel injection valve is located near a port that is opened and closed by the piston. The air intake-type two-stroke engine operates without reed valves, which are associated with the fuel injection valve, in this configuration.

The effects and objects of the present invention will become apparent from the following detailed description of preferred embodiments.

DETAILED DESCRIPTION OF THE PRESENT INVENTION

Figure 1:
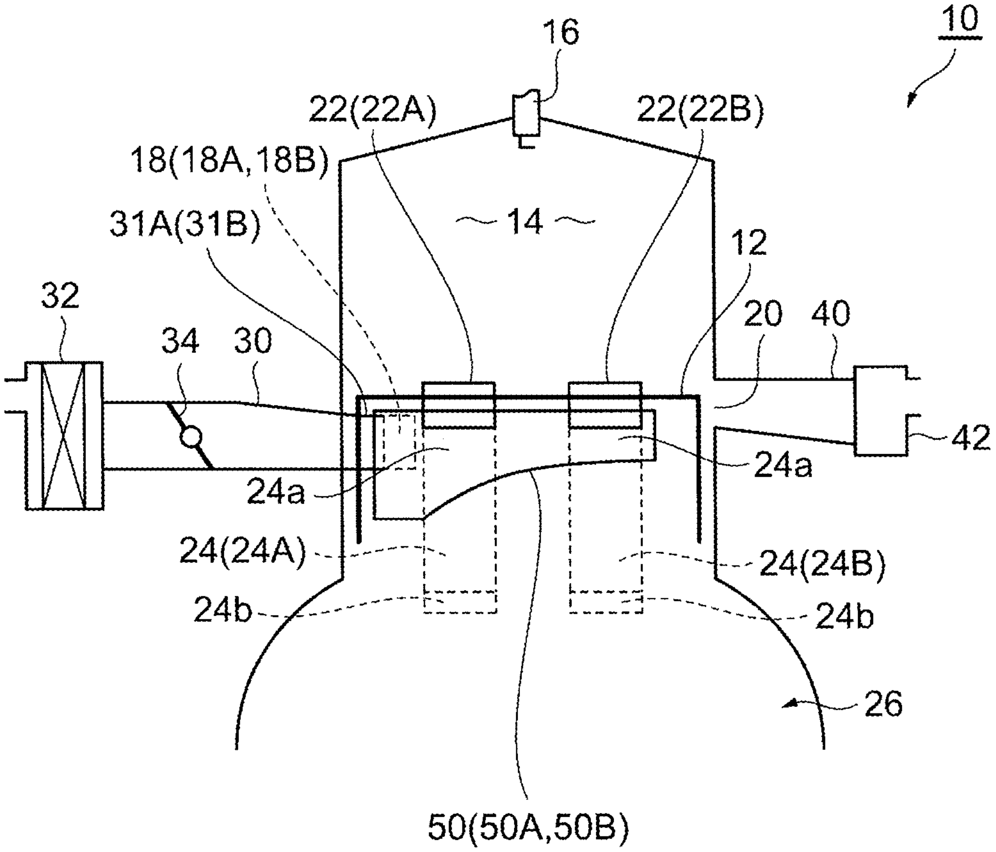
FIG. 1 is a schematic view of a piston valve-type two-stroke engine, specifically, an air intake-type two-stroke engine, according to the present invention.

Hereinafter, preferred embodiments of the present invention will be described with reference to the drawings. FIG. 1 is a schematic view of a two-stroke engine according to the present invention. The two-stroke engine is used as a power source for a portable working machine such as a chain saw and a brush cutter, but it is not particularly limited to them.

An air intake-type two-stroke engine 10 illustrated in FIG. 1 is a single-cylinder, and it is an air-cooled engine. The air intake-type two-stroke engine 10 has a combustion chamber 14 formed by a piston 12 that reciprocates up and down. An ignition plug 16 is provided on the upper end of the combustion chamber 14. The cylinder has an intake port 18, an exhaust port 20, and scavenging ports 22 on its inner circumferential surface: these ports 18, 20, 22 are opened and closed by the piston 12. That is, the air intake-type two-stroke engine 10 is a piston valve type engine.

The scavenging ports 22 include a total of four ports. A pair of first scavenging ports 22A on the intake port 18 side facing each other across the intake port 18, and a pair of second scavenging ports 22B on the exhaust port 20 side. However, the number of scavenging ports 22 is arbitrary: they may be, for example, a pair of scavenging ports. An upper end portion 24*a* of each scavenging passage 24 is connected to each scavenging port 22. In other words, the upper end opening of each scavenging passage 24 constitutes each scavenging port 22. Each scavenging passage 24 is a vertically extending passage, and the lower end opening 24*b* of each scavenging passage 24 is connected to a crankcase 26. As is well known, a crankshaft (not shown) is arranged in the crankcase 26, and this crankshaft is connected to the piston 12 via a connecting rod (not shown).

In FIG. 1, reference numeral 24A indicates the first scavenging passage, which is provided to the intake port 18 side and connected to the first scavenging port 22A. Reference numeral 24B indicates the second scavenging passage, which is provided to the exhaust port 20 side and connected to the second scavenging port 22B.

A common intake passage 30 connecting to the intake port 18 has an air cleaner 32 at its upstream end. The air filtered by the air cleaner 32 is supplied to the common intake passage 30. A throttle valve 34, which controls the volume of air, is provided midway in the common intake passage 30. On the other hand, a muffler 42 is provided on an exhaust passage 40 connecting to the exhaust port 20.

The piston 12 has piston grooves 50 on its circumferential surface. The piston grooves 50 include the first piston groove 50A and the second piston groove 50B. These piston grooves are provided on either side with respect to the exhaust port 20 in the state where the piston is inserted into the cylinder. The first piston groove 50A is provided facing the scavenging passages 24A and 24B located on one side of the cylinder, and it is connected to these scavenging passages during the intake process. Meanwhile, the second piston groove 50B is provided facing the scavenging passages 24A and 24B located on the other side of the cylinder, and it is connected to these scavenging passages during the intake process.

The intake ports 18 include a first intake port 18A and a second intake port 18B. The first intake port 18A is provided on one side of the cylinder in relation to the first piston groove 50A. The second intake port 18B is provided on the other side of the cylinder in relation to the second piston groove 50B. These intake ports 18A and 18B are connected to the common intake passage 30 via the first and second branch intake passages 31A and 31B. That is, the common intake passage 30 branches into two at its downstream. The first branch intake passage 31A is connected to the first intake port 18A, and the second branch intake passage 31B is connected to the second intake port 18B.

In the intake process of the air intake-type two-stroke engine 10, the fresh air filtered by the air cleaner 32 is taken into the crankcase 26 through two routes. More specifically, in the first route, the fresh air to be supplied to the crankcase 26 passes through the common intake passage 30, the first branch intake passage 31A, the first intake port 18A, and the first piston groove 50A. This fresh air passes through the scavenging passages 24A and 24B located on one side of the cylinder. This fresh air enters these scavenging passages through their upper end portions 24*a*, and it is introduced into the crankcase 26 through their lower end openings 24*b*.

In the second route, the fresh air to be supplied to the crankcase 26 passes through the common intake passage 30, the second branch intake passage 31B, the second intake port 18B and the second piston groove 50B. This fresh air passes through the scavenging passages 24A and 24B located on the other side of the cylinder. This fresh air enters these scavenging passages through their upper end portions 24*a*, and it is introduced into the crankcase 26 through their lower end openings 24*b*.

In the scavenging process of the air intake-type two-stroke engine 10, the fresh air pre-compressed in the crankcase 26 is discharged as a scavenging flow into the combustion chamber 14 through each of the four scavenging ports 22, namely, the pair of first scavenging ports 22A on the intake port 18 side and the pair of second scavenging ports 22B on the exhaust port 20 side.

The air intake-type two-stroke engine 10 is preferably a Schnuerle ported engine. Specifically, scavenging is performed by directing the fresh air discharged from the scavenging ports 22 toward the intake port 18 side, which is opposite to the exhaust port 20.

Figure 2:
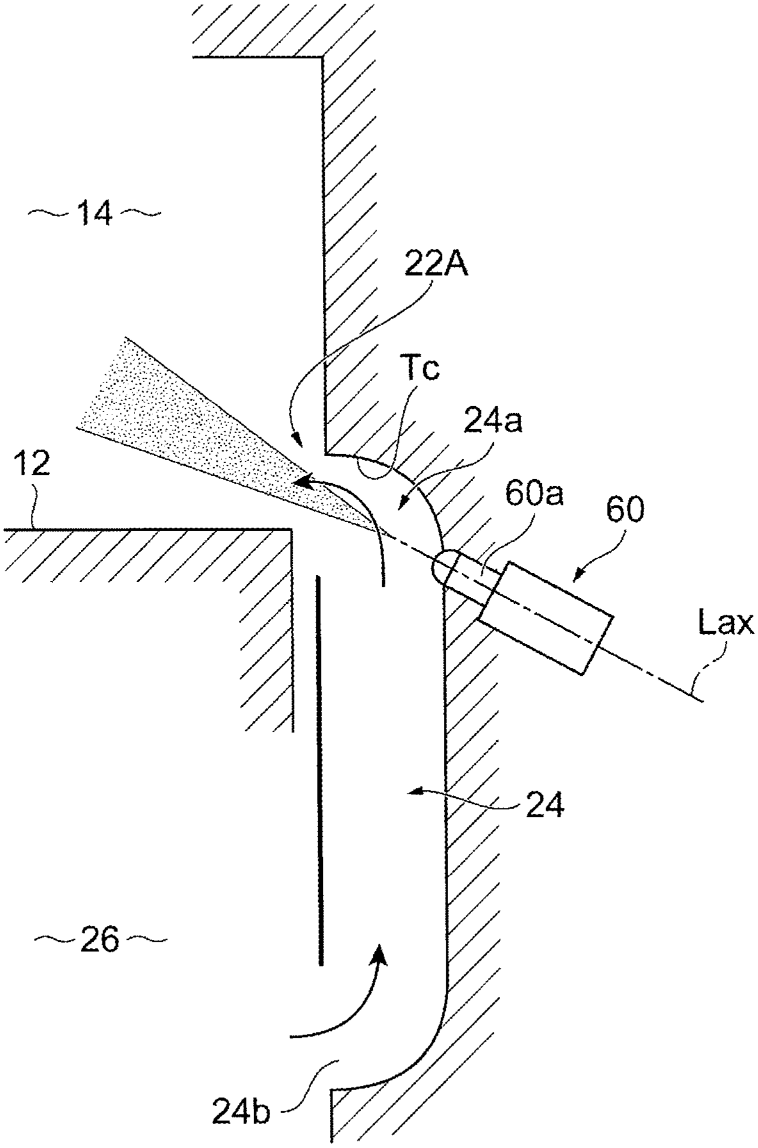
FIG. 2 is a view for explaining a specific example in which a fuel injection valve is provided at the upper end portion of a scavenging passage of the air intake-type two-stroke engine.

The air intake-type two-stroke engine 10 has a fuel injection valve 60, which provides blended fuel. The blended fuel contains lubricating oil. Referring to FIG. 2, the fuel injection valve 60 is provided on at least one scavenging passage 24A or 24B. The fuel injection valve 60 is assembled to the upper end portion 24*a* of the scavenging passage 24.

A typical mounting embodiment of the fuel injection valve 60 will be described below with reference to FIG. 2. The fuel injection valve 60 discharges atomized blended fuel. The fuel injection valve 60 includes a nozzle assembly 60*a*, which has a length with an axis, at its tip. The blended fuel is discharged from the nozzle of the nozzle assembly 60*a*. The axis of the fuel injection valve 60 is indicated as "Lax." As illustrated in FIG. 2, the fuel injection valve 60 is preferably provided so that it discharges the blended fuel toward the center of the scavenging port 22, i.e., the center of the upper end opening of the scavenging passage 24.

The fuel injection valve 60, which is located at the upper end portion 24*a* of the scavenging passage 24, is preferably mounted so that its fuel discharge direction is approximately parallel to the inclination of the ceiling part of the scavenging passage 24. In FIG. 2, the fuel discharge direction of the fuel injection valve 60 is indicated as the axis "Lax", and the ceiling part of the scavenging passage 24 is indicated as "Tc." The air pre-compressed in the crankcase 26 is discharged into the cylinder through the scavenging passage 24 in the scavenging process. At that time, a scavenging flow is formed through the scavenging passage 24 and the scavenging port 22. The scavenging flow has a directionality. By setting the fuel injection direction of the fuel injection valve 60 to be approximately parallel to the inclination of the ceiling part "Tc", the flow direction of the fuel injected from the fuel injection valve 60 is not easily affected by the scavenging flow flowing from the inside of the scavenging passage 24 into the cylinder.

As mentioned above, the fuel injection valve 60 is provided at the upper end portion 24*a* of the scavenging passage 24 with the axis "Lax" of the fuel injection valve 60 directed to the scavenging port 22. Most preferably, the fuel injection valve 60 is mounted so that the axis "Lax" is approximately parallel to the inclination of the ceiling part "Tc" at the upper end of the scavenging passage 24. This arrangement prevents fuel from adhering to or staying at the opening edge of the scavenging port 22 and enables all of the fuel to be reliably delivered into the cylinder.

The upper end portions 24*a* of the scavenging passages 24 are opened into the cylinder through the scavenging ports 22. In other words, the upper end openings of the scavenging passages 24 are the scavenging ports 22. The axis "Lax" of the fuel injection valve 60 is directed toward the scavenging port 22. That is, the fuel injection valve 60 is mounted so that the extended line of the axis "Lax" passes through the scavenging port 22 and extends into the cylinder.

For reducing the fuel problem "blow-by" further, the fuel injection valve 60 is preferably provided in the first scavenging passage 24A connecting to the first scavenging port 22A on the intake port 18 side. This configuration prevents the lubricant component of the blended fuel injected from the fuel injection valve 60 from flowing into the exhaust port 20.

Figure 3:
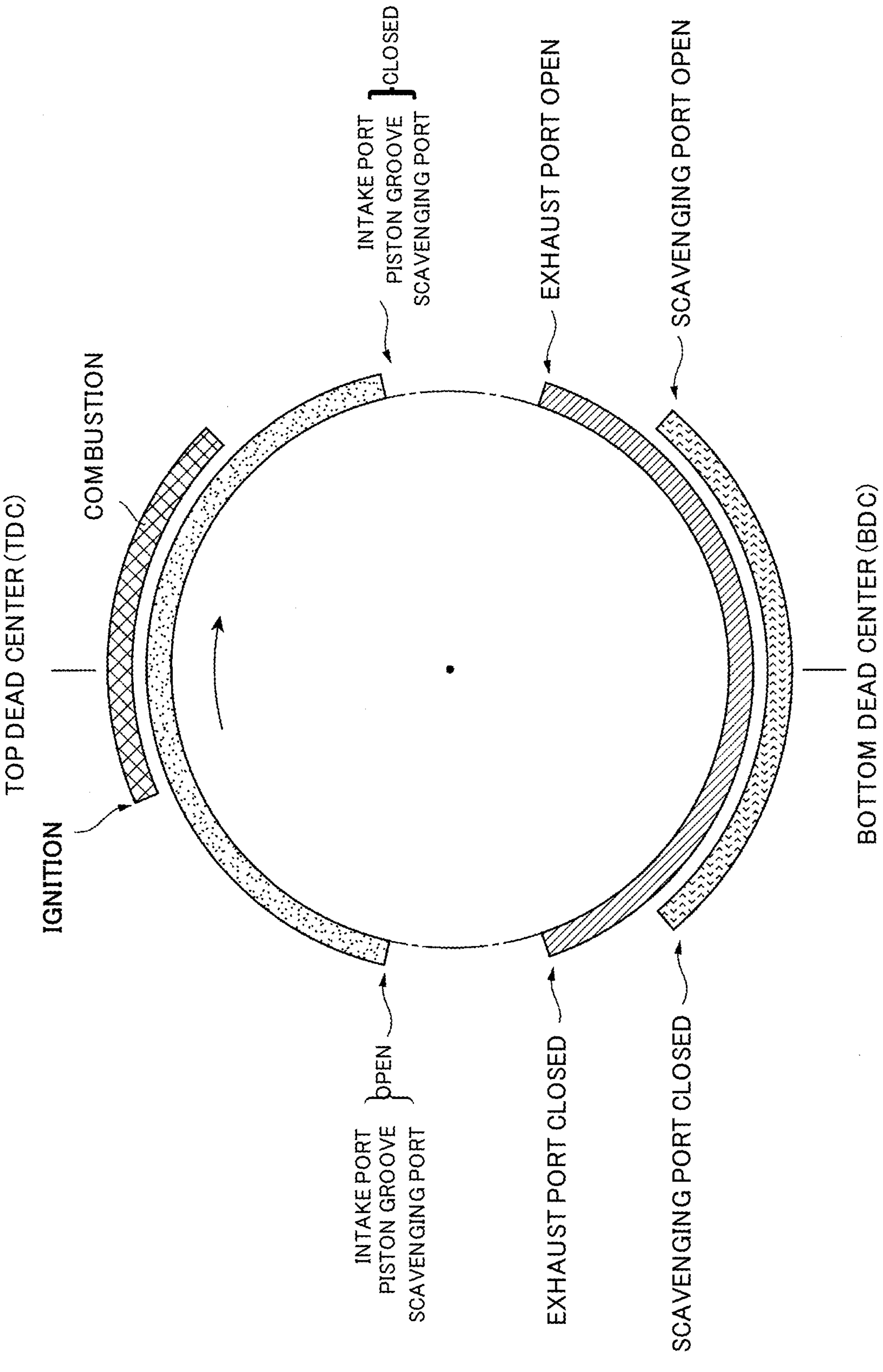
FIG. 3 is a chart for illustrating the opening and closing timing of each port included in the air intake-type two-stroke engine and the ignition timing.

FIG. 3 is a chart for illustrating the ignition timing and the opening and closing timing of the plurality of ports included in the air intake-type two-stroke engine 10. The arrow indicates the rotational direction of the crankshaft. The left half of the figure shows the upward stroke as the piston 12 moves from the bottom dead center (BDC) to the top dead center (TDC). On the other hand, the right half of the figure shows the downward stroke as the piston 12 moves from the top dead center (TDC) to the bottom dead center (BDC). The ignition timing of the ignition plug 16 is set to be just before the piston 12 reaches the top dead center (TDC) in the upward stroke. In the downward stroke, the scavenging process begins with opening of each scavenging port 22 immediately after the exhaust port 20 opens.

The fuel injection timing of the fuel injection valve 60 installed at the upper end portion 24*a* of the scavenging passage 24 is preferably set in the upward stroke of the piston 12, i.e., the scavenging process. In the intake process, air fills the scavenging passage 24 via the crankcase. This air remains in a small space within the scavenging passage for a short time. Therefore, the blended fuel component can be added only to part of the air at the upper end portion 24*a* of the scavenging passage 24 by coordinating the fuel injection timing with the location of the fuel injection valve 60 and the scavenging process, i.e., the timing of opening the scavenging port 22 by the piston 12.

In contrast with the case where the fuel injection valve 60 is located in the midway portion or lower part of the scavenging passage 24, the air intake-type two-stroke engine 10 of the embodiment has four advantages. The first advantage is that the air layer and the air-fuel mixture layer can be introduced into the cylinder in sequence because air and the blended fuel do not mix easily within the scavenging passage 24. As a result, the scavenging effect by air in the scavenging process can be maintained. The second advantage is that controlling the injection direction and tunning the engine can be made easy because the fuel injection valve is located close to the interior of the cylinder.

The third advantage is that the fuel component injected by the fuel injection valve 60 enters the cylinder directly. This fuel component is not easily mixed with the surrounding gas in the scavenging passage 24 because the fuel injection valve 60 is located close to the scavenging port 22 in the air intake-type two-stroke engine 10. The last advantage is that the fuel injection contributes cooling the cylinder and the piston 12. The temperature at the upper portion of scavenging passage 24 is dropped by the fuel injection.

Figure 4:
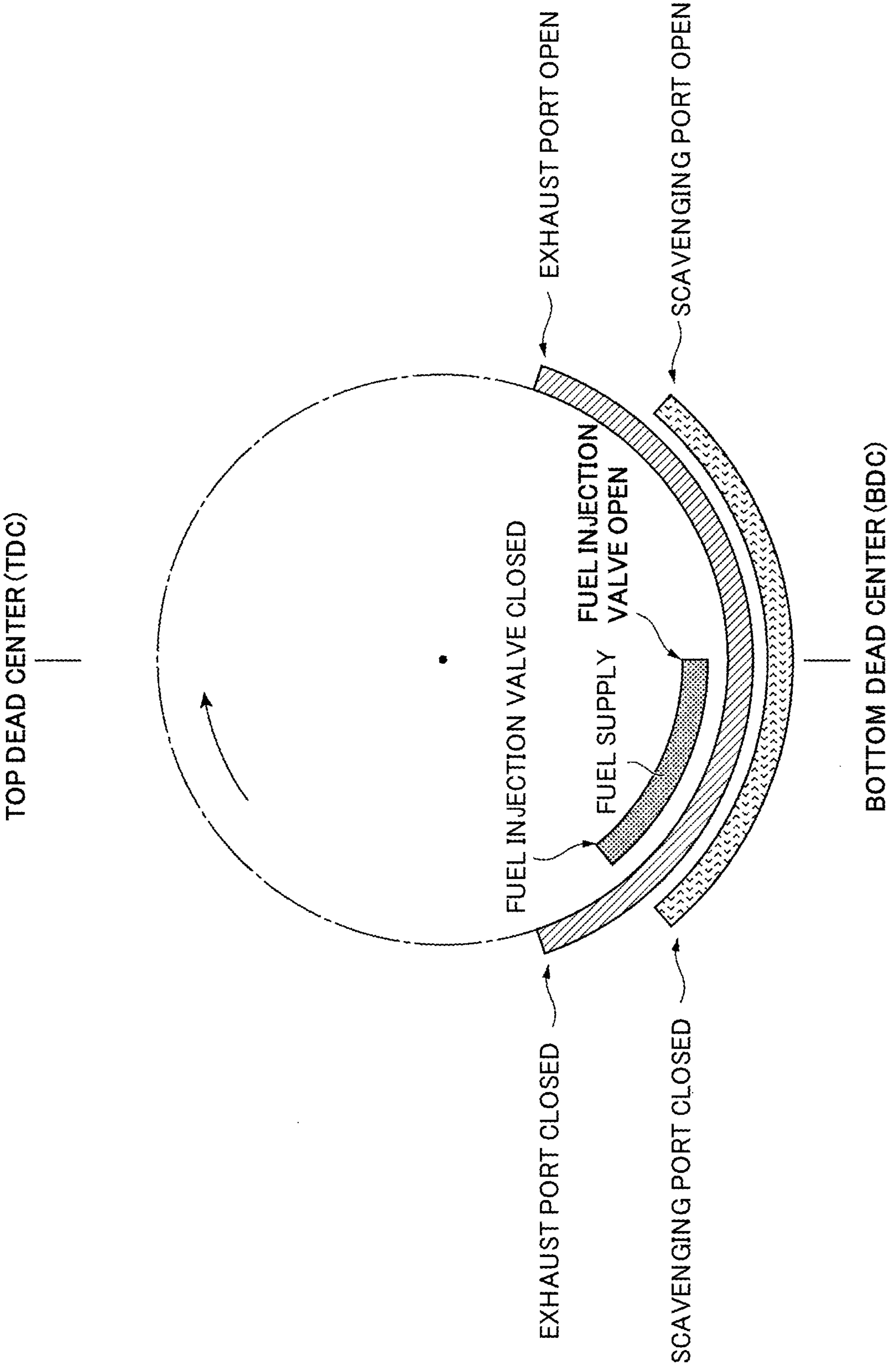
FIG. 4 is a chart for illustrating an example of the fuel injection timing of the air intake-type two-stroke engine.

FIG. 4 is a chart of the specific injection timing of the fuel injection valve 60. The timing of ignition and the timing of opening and closing the ports correspond to the chart of FIG. 3 described above. Referring to FIG. 4, the fuel injection valve 60 opens and injects the blended fuel in the latter half of the scavenging process, where the scavenging port 22 opens. Also, the fuel injection valve 60 closes just before the scavenging port 22 closing, that is, just before the end of the scavenging process. To be more specific, the blended fuel is supplied from the fuel injection valve 60 into the cylinder through the upper end portion 24*a* of the scavenging passage 24 and the scavenging port 22 in the latter half of the scavenging process, that is, from the point when the piston 12 starts moving upward from the bottom dead center (BDC) until just before the end of the scavenging process. The period of fuel supply to the scavenging passage 24 is short, and exhaust port 20 closes immediately after the fuel injection valve 60 injects the blended fuel. The fuel problem "blow-by" can be prevented by combining the above-mentioned arrangement of the fuel injection valve 60, the direction of the axis "Lax" of the fuel injection valve 60, which extends into the cylinder passing through the scavenging port 22, and the fuel injection timing illustrated in FIG. 4.

As described above, the air intake-type two-stroke engine 10 is characterized in that fresh air flows back and forth through the scavenging passage 24 in the scavenging process and the intake process. That is, fresh air flows upward from the lower end opening 24*b* to the upper end portion 24*a* through the scavenging passage 24 in the scavenging process. On the other hand, fresh air flows downward from the upper end portion 24*a* to the lower end opening 24*b* through the scavenging passage 24 in the intake process.

The air intake-type two-stroke engine 10 can solve the fuel problem "blow-by" by utilizing the feature which fresh air flows back and forth through the scavenging passage 24 in two processes and combining the arrangement of the fuel injection valve 60 (arranged at the upper end portion 24*a* of the scavenging passage 24), the fuel injection direction (the direction of the axis "Lax"), and the fuel injection timing (fuel injection in the latter half of the scavenging process). Furthermore, the air intake-type two-stroke engine 10 can lubricate the crankcase 26 as will be described next.

At the upper end portion 24*a* of the scavenging passage 24, a part of the blended fuel injected from the fuel injection valve 60 in the latter half of the scavenging process immediately enters the cylinder through the scavenging port 22, and the scavenging port 22 is closed immediately after that by the piston 12. By injecting fuel at this timing, the air-fuel mixture required for combustion is created only in the latter half of scavenging process; and therefore, the fuel problem "blow-by" can be reduced. In addition, the remainder of the injected fuel component remains in the scavenging passage 24, for example by adhering to the wall surface of the scavenging passage 24, due to the close of the scavenging port 22 immediately after injection. This remaining blended fuel is introduced into the crankcase 26 along with the suction flow of fresh air passing through the scavenging passage 24 when the pressure within the crankcase 26 becomes negative in the next intake process. This introduced blended fuel lubricates the crankcase 26. The air intake-type two-stroke engine 10 can supply a lubricating oil component to the combustion chamber 14 and the crankcase 26 by simply setting the fuel injection timing at a specific period and location within its single cycle. Thus, installing a separate oil supply device is unnecessary.

The fuel injection timing is coordinated with the scavenging port opening and closing timing of the piston valve so that excess fuel component that would cause "blow-by" is all sucked into the crankcase 26 in the system of the present invention. Hence, the air intake-type two-stroke engine 10 operates without additional opening and closing components such as the reed valves disclosed in U.S. Pat. No. 10,858,985 B2 and their control.

Figure 5:
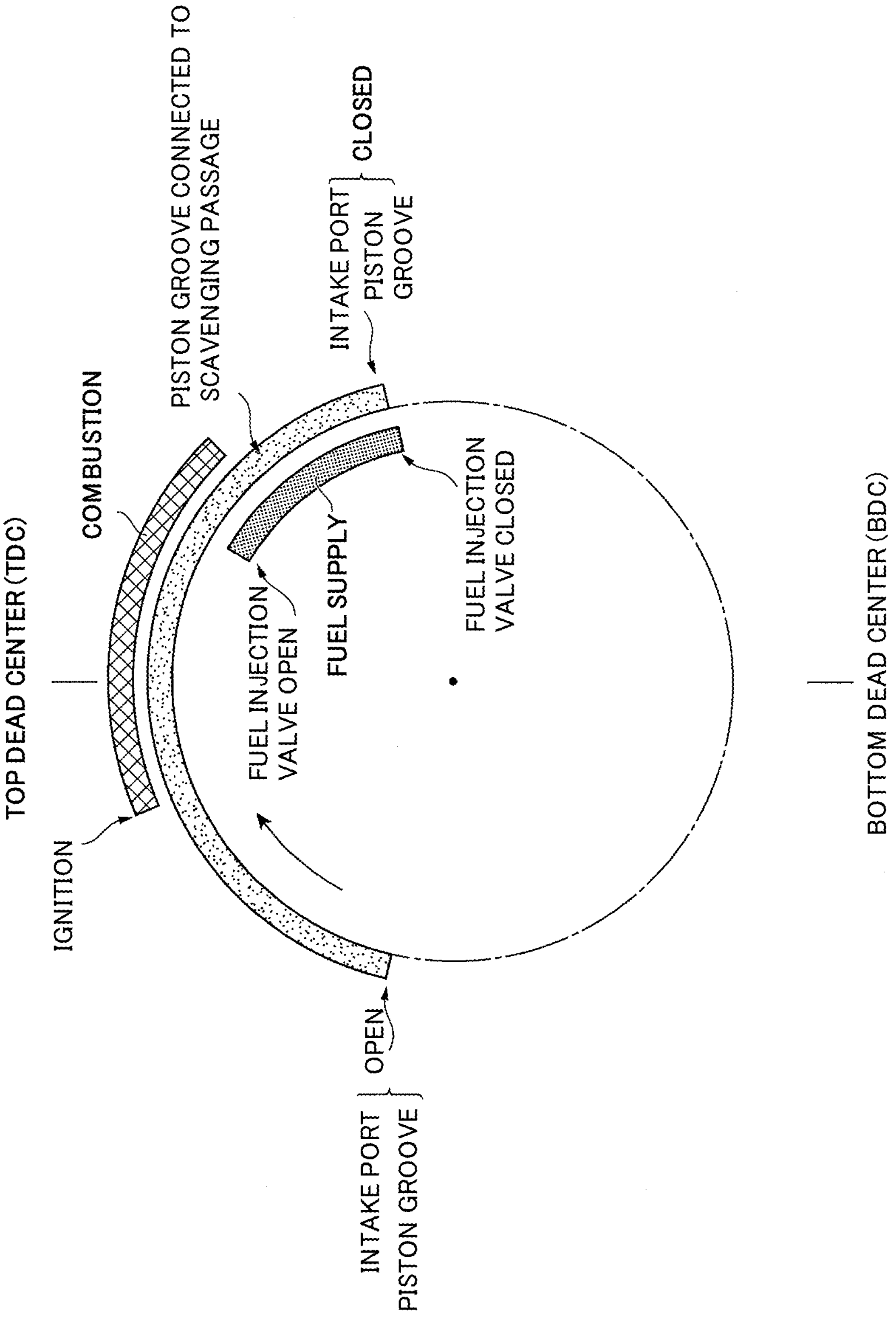
FIG. 5 is a chart for illustrating another example of fuel injection timing of the air intake-type two-stroke engine.

FIG. 5 is a chart of a modified fuel injection timing. The basic difference from the first fuel injection timing described above with reference to FIG. 4 is that the fuel injection valve 60 injects the fuel component into the cylinder in the latter half of the combustion period. To be more specific, the fuel injection valve 60 injects the fuel component when the intake port 18 is connected to the scavenging ports 22 through the piston grooves 50 during the downward stroke of the piston 12, that is, when the piston 12 moves from the top dead center to the bottom dead center. The scavenging ports 22 are closed by the piston 12 immediately thereafter. The scavenging ports 22 face the piston skirt which is a frictionally sliding surface; then, they are connected to the piston grooves 50. A part of the fuel component not reaching the interior of the cylinder adheres to the piston skirt; it is introduced into the piston groove 50 that is connected thereafter. The fuel component adhering to the piston skirt is used for piston lubrication. Meanwhile, the fuel component introduced into the piston groove 50 is sucked into the crankcase 26 and used for lubrication of the crankcase 26. At this time, the gas flows in the order of the common intake passage 30, the piston grooves 50, the scavenging passages 24, and the crankcase 26. Therefore, the fuel component injected in the scavenging passage 24 moves toward the crankcase 26 along the gas flow, and it is not blown back into the common intake passage 30.

Figure 6:
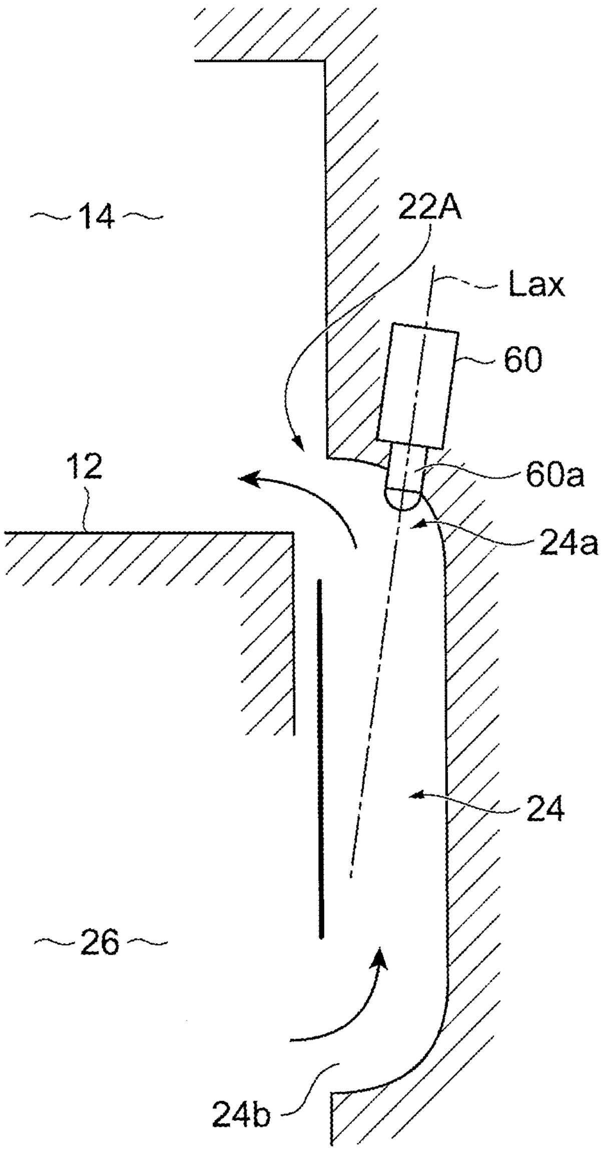
FIG. 6 is a view for explaining a modification example of the fuel injection direction of the fuel injection valve provided at the upper end portion of the scavenging passage.

In the case where the main injection period is during the upward stroke of the piston 12 as illustrated in FIG. 4, the direction of the axis "Lax" of the fuel injection valve 60 is preferably inclined perpendicular to the cylinder axis, i.e., horizontal, or inclined downward toward the crankcase 26 (FIG. 6). The lower end opening 24*b* of the scavenging passage 24 is connected to the crankcase 26. Accordingly, the fuel discharged from the fuel injection valve 60 in the upward stroke of the piston 12 is introduced into the crankcase 26 along with the flow of fresh air toward the crankcase 26 through the scavenging passage 24 in the typical arrangement configuration of the fuel injection valve 60 illustrated in FIG. 6. The fuel component introduced into the crankcase 26 is used to lubricate the crankcase 26; it is also introduced from the scavenging passage 24 into the cylinder in the latter half of the scavenging process of the next cycle to be used for combustion.

As described above, the arrangement in which the fuel injection valve 60 is installed at the upper end portion 24*a* of the scavenging passage 24 of the air intake-type two-stroke engine 10 makes it possible to utilize the opening and closing of the piston 12 as a valve for switching the directions of fuel introduction. Fuel component can be supplied to both the cylinder and the crankcase 26 without a lubrication device for the crankcase 26 or a valve structure for controlling fuel supply and its timing.

Figure 7:
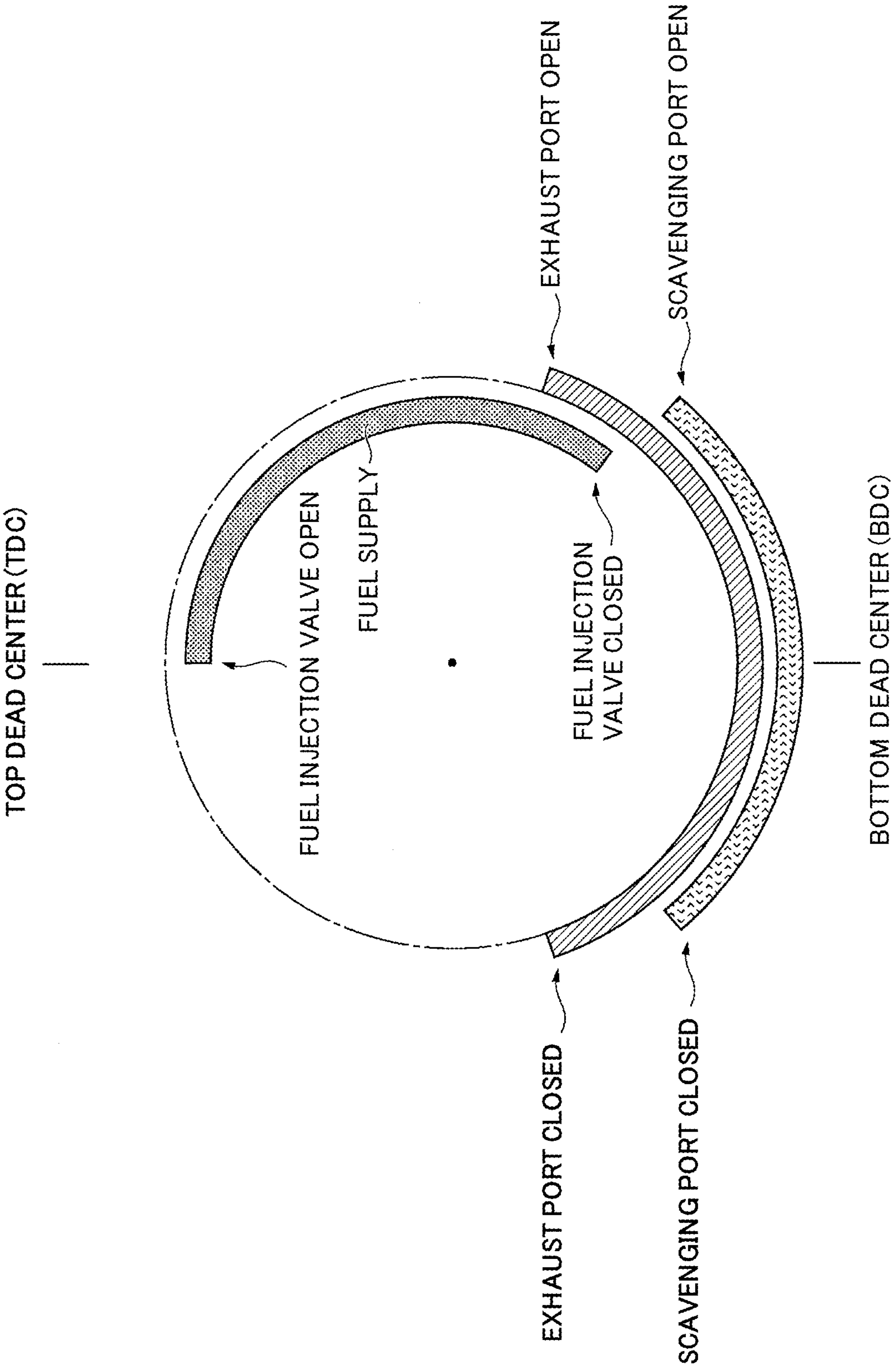
FIG. 7 shows a chart for explaining a conventional fuel supply timing as a comparative example.

FIG. 7 is a chart for explaining the fuel supply timing of a two-stroke engine in which the fuel injection valve 60 is conventionally located in the crankcase 26 as a comparative example. The fuel injection valve 60 opens in the downward stroke of the piston 12 so that fuel is supplied to the crankcase 26. One of the advantages of this conventional two-stroke engine is supplying a uniform mixture to the combustion chamber 14 since the fuel supplied to the crankcase 26 is mixed with air in the crankcase 26 until the scavenging ports 22 open in the next cycle and the scavenging process begins. Another advantage is lubricating the crankcase 26 smoothly. This conventional method, however, cannot solve the fuel problem "blow-by" as described above.

10 air intake-type two-stroke engine
12 piston
14 combustion chamber
16 ignition plug
18 intake port
20 exhaust port
22 scavenging port
24 scavenging passage
24*a* upper end portion of scavenging passage
24*b* lower end opening of scavenging passage
26 crankcase
30 common intake passage
31A first branch intake passage
31B second branch intake passage
32 air cleaner
50 piston groove
60 fuel injection valve
60*a* nozzle assembly
Lax axis of fuel injection valve
Tc ceiling part at upper end of scavenging passage

What is claimed is:

1. An air intake-type two-stroke engine comprising:
an intake port leading to an intake passage and opening to an inner circumferential surface of a cylinder;
an exhaust port leading to an exhaust passage and opening to the inner circumferential surface of the cylinder;
scavenging ports connected to the upper end portions of scavenging passages that are connected to a crankcase and opened in the inner circumferential surface of the cylinder;
a piston forming a combustion chamber and reciprocating up and down; and
piston grooves formed on a peripheral surface of the piston and capable of connecting to the intake port and the scavenging passages,
in an intake process, fresh air being supplied to the crankcase through the intake passage, the intake port, the piston grooves, and the scavenging passages,
in a scavenging process in which the scavenging ports are opened to scavenge the cylinder, the fresh air pre-compressed in the crankcase being discharged into the cylinder through the scavenging passages and the scavenging ports,
the intake port, the exhaust port, and the scavenging ports being opened and closed by the piston,
wherein a fuel injection valve is installed at the upper end portion of the scavenging passage and an axis of the fuel injection valve is directed toward the scavenging port, and
wherein the fuel injection valve has a fuel injection timing set to a single predetermined period of time in one cycle of the two-stroke engine.

2. The air intake-type two-stroke engine of claim 1,
wherein the axis of the fuel injection valve is directed toward the center of the scavenging port.

3. The air intake-type two-stroke engine of claim 1,
wherein the fuel injection valve is installed at the upper end of the scavenging passage such that the axis of the fuel injection valve is approximately parallel to the inclination of the ceiling part of the scavenging passage.

4. The air intake-type two-stroke engine of claim 1,
wherein the fuel injection timing is set to the latter half of the scavenging process.

5. The air intake-type two-stroke engine of claim 1,
wherein the fuel injection timing is set to the latter half of the combustion process.

6. The air intake-type two-stroke engine of claim 1,
wherein the air intake-type two-stroke engine is a Schnuerle-ported two-stroke engine, and
wherein the fresh air discharged from the scavenging ports into the cylinder is directed toward the intake port side, which is opposite to the exhaust port, in the scavenging process.

7. The air intake-type two-stroke engine of claim 1, wherein the intake port, the exhaust port, and the scavenging ports are opened and closed solely by the piston without any additional opening/closing parts.

* * * * *